United States Patent
Moffat et al.

(10) Patent No.: US 7,637,627 B2
(45) Date of Patent: Dec. 29, 2009

(54) ARRANGEMENT FOR THE ILLUMINATION OF A FIELD

(75) Inventors: Bryce Anton Moffat, Jena (DE); Artur Degen, Jena (DE); Axel Bodemann, Jena (DE)

(73) Assignee: Carl Zeiss AG, Oberkochen (DE)

( * ) Notice: Subject to any disclaimer, the term of this patent is extended or adjusted under 35 U.S.C. 154(b) by 496 days.

(21) Appl. No.: 11/532,699

(22) Filed: Sep. 18, 2006

(65) Prior Publication Data

US 2007/0064202 A1    Mar. 22, 2007

(30) Foreign Application Priority Data

Sep. 17, 2005   (DE) .................... 10 2005 044 580

(51) Int. Cl.
*F21V 8/00* (2006.01)
(52) U.S. Cl. ..................................... 362/234; 362/231
(58) Field of Classification Search ................. 362/231, 362/234, 237
See application file for complete search history.

(56) References Cited

U.S. PATENT DOCUMENTS 6,318,863 B1  11/2001  Tiao et al.
7,153,015 B2 * 12/2006 Brukilacchio ............... 362/555
7,494,228 B2 *  2/2009 Harbers et al. ............... 362/231
2004/0264185 A1 * 12/2004 Grotsch et al. ............... 362/231
2005/0190562 A1 *  9/2005 Keuper et al. ................ 362/231
2009/0033876 A1 *  2/2009 Shimaoka et al. ............ 362/231

FOREIGN PATENT DOCUMENTS

DE    103 41 626    4/2005
EP    1 398 659     3/2004

* cited by examiner

*Primary Examiner*—David V Bruce
(74) *Attorney, Agent, or Firm*—Reed Smith LLP

(57) ABSTRACT

An arrangement for the illumination of a field which uses, as a combined light source, three groups of LEDs which emit light bundles in different colors (R, G, B). The light bundles—considered in the direction of light propagation—pass collector optics, a device for combining the light bundles, and in-coupling optics. There are three light sources, each comprising a matrix of red LEDs, green LEDs, or blue LEDs, the light-emitting surface of each LED matrix being coupled with a light inlet face of a concentrator, each concentrator opening in a funnel-shaped manner in the light propagation direction. The collector optics and in-coupling optics are dimensioned in such a way that the surface shape of every light-emitting surface of the concentrators is transmitted to a light inlet face of the light mixing rod in such a way that they are congruently superimposed on one another.

11 Claims, 2 Drawing Sheets

ARRANGEMENT FOR THE ILLUMINATION OF A FIELD

CROSS-REFERENCE TO RELATED APPLICATION

This application claims priority of German Application No. 10 2005 044 580.2, filed Sep. 17, 2005 the complete disclosure of which is hereby incorporated by reference.

BACKGROUND OF THE INVENTION a) Field of the Invention

The invention is directed to an arrangement for the illumination of a field which uses, as light source, three groups of LEDs which emit light bundles (100) of different colors (red, green, blue), wherein the light bundles—considered in the direction of light propagation—pass collector optics, a device for combining the light bundles, and in-coupling optics. The arrangement is applied particularly as an illumination module in projectors. The field in question is identical to the light inlet face of a light mixing rod. Another application, for example, is the illumination of objects in microscopes.

b) Description of the Related Art

DE 103 41 626 A1 discloses an illumination module for displaying color images which uses three LEDs or LED arrays as light source. The light components in the three primary colors, red, green and blue, are coupled into a light inlet face of a light mixing rod via dichroid filters. Refractive lenses are used for beam shaping to couple the light emitted by the LEDs into the light inlet face of the light mixing rod. This reference shows that identical optics are used for an LED and for an LED array. While an individual LED can be regarded in a first approximation as a point light source, the geometric-optical ratios in an LED array are fundamentally different, which should be taken into account in the design of the optical arrangement, especially when the aim is to couple the light emitted by the LED array into the light mixing rod as completely as possible.

OBJECT AND SUMMARY OF THE INVENTION

The problem to be solved by the invention is to improve the in-coupling efficiency of an arrangement for illuminating a trapezoidal field. The field should be illuminated as homogeneously as possible. The arrangement should contain parts which are identical or very similar as far as possible and should be capable of being produced inexpensively.

This object is met, according to the invention, in an arrangement for the illumination of a field comprising a combined light source having three groups of LEDs which emit light bundles in different colors (R, G, B). The light bundles—considered in the direction of light propagation—pass collector optics. A device is included for combining the light bundles. In-coupling optics are also included. The combined light source has a first light source comprising a matrix of red LEDs, a second light source comprising a matrix of green LEDs and a third light source comprising a matrix of blue LEDs. Each LED matrix has a light-emitting surface coupled with a light inlet face of a concentrator. Each concentrator opens in a funnel-shaped manner in the light propagation direction. The collector optics and in-coupling optics are dimensioned in such a way that the surface shape of every light-emitting surface of the concentrators is transmitted to a light inlet face of the light mixing rod in such a way that they are congruently superimposed on one another.

According to the invention, a first light source comprises a matrix of red LEDs, a second light source comprises a matrix of green LEDs, and a third light source comprises a matrix of blue LEDs. The light-emitting surface of each LED matrix is optically coupled with a light inlet face of a respective concentrator, each concentrator opening in a funnel-shaped manner in the light propagation direction. The collector optics and in-coupling optics are dimensioned in such a way that the surface shape of every light-emitting surface of the concentrators is transmitted to a light inlet face of the light mixing rod in such a way that they are congruently superimposed on one another.

The matrix of LEDs has a trapezoidal light-emitting surface. In most applications, a rectangular surface is advisable. The rectangle preferably has a lateral magnification of 3:4 or 16.9 in applications in projection technology.

The light-emitting surface of the concentrator is likewise trapezoidal. In particular, this surface is rectangular and also preferably has a lateral magnification of 3:4 or 16.9.

The cross sections of the light-emitting surface, the light inlet face and the light-emitting surface can be geometrically similar or can undergo a conversion.

It is also important that every concentrator reduces the numerical aperture of the light bundles at the light-emitting surface by a factor between 0.6 and 0.3. In practice, this means that the emitting angle at the light-emitting surface is between ±17° and ±37° relative to the optical axis.

The in-coupling efficiency is also increased in that an air gap between 0 and 1 mm, preferably 0.2 mm, is provided between the light-emitting surfaces of the matrix of red/green/blue LEDs and the light inlet face of the concentrator.

The device for combining the light bundles preferably contains two interference layer beamsplitters. The interference layers are arranged on a surface of a plane-parallel plate, beamsplitter cube or beamsplitter prism.

The construction is simplified in that the light-emitting surfaces of the concentrators are congruent. It is particularly advantageous that identically constructed concentrators are used for the red, green and blue LED arrays.

Another advantage consists in that the three collector optics are also identical. Production costs are reduced through large-scale manufacture.

The collector optics contain only two lenses: a concave-convex lens and a biconvex lens which can be produced in a simple manner.

The in-coupling optics contain a biconvex lens and a concave-convex lens whose important parameters are similar to those of the lenses of the collector optics. Economical production of the optics is also ensured by this step.

The third collector optics and the in-coupling optics define an optical axis that is identical to the center of gravity axis of the light mixing rod.

An optical axis of the first collector optics has a first offset and the optical axis of the second collector optics has a second offset to the optical axis, wherein the center of gravity axes of the light-emitting surfaces of the concentrators associated with the collector optics are identical to the optical axes of the collector optics. This offset ensures that the surfaces illuminated by the colors red, green, blue are superimposed congruently on the light inlet face of the light mixing rod.

The collector optics and the in-coupling optics generate an identical imaging scale. Telecentricity is present on both sides between the inputs of the collector optics and the output of the in-coupling optics. The imaging is effected without distortion and without vignetting.

The concentrator can be formed of an individual light-conducting rod. Concentrators comprising a transparent solid body and hollow concentrators can both be used. However, the concentrator can also be formed of a matrix of individual integrator rods, each integrator rod being coupled with an individual LED or matrix of LEDs. The emitting surfaces and emitting angles of the LEDs can accordingly be better adapted to the dimensions of the concentrator, the numerical aperture and the dimensions of the field to be illuminated.

The invention will be described in the following with reference to embodiment examples.

BRIEF DESCRIPTION OF THE DRAWINGS

In the drawings:

FIG. 1 shows an arrangement for the illumination of a field which is a light inlet face 14 of a light mixing rod 107 in the present example.

DESCRIPTION OF THE PREFERRED EMBODIMENTS

Figure 1:
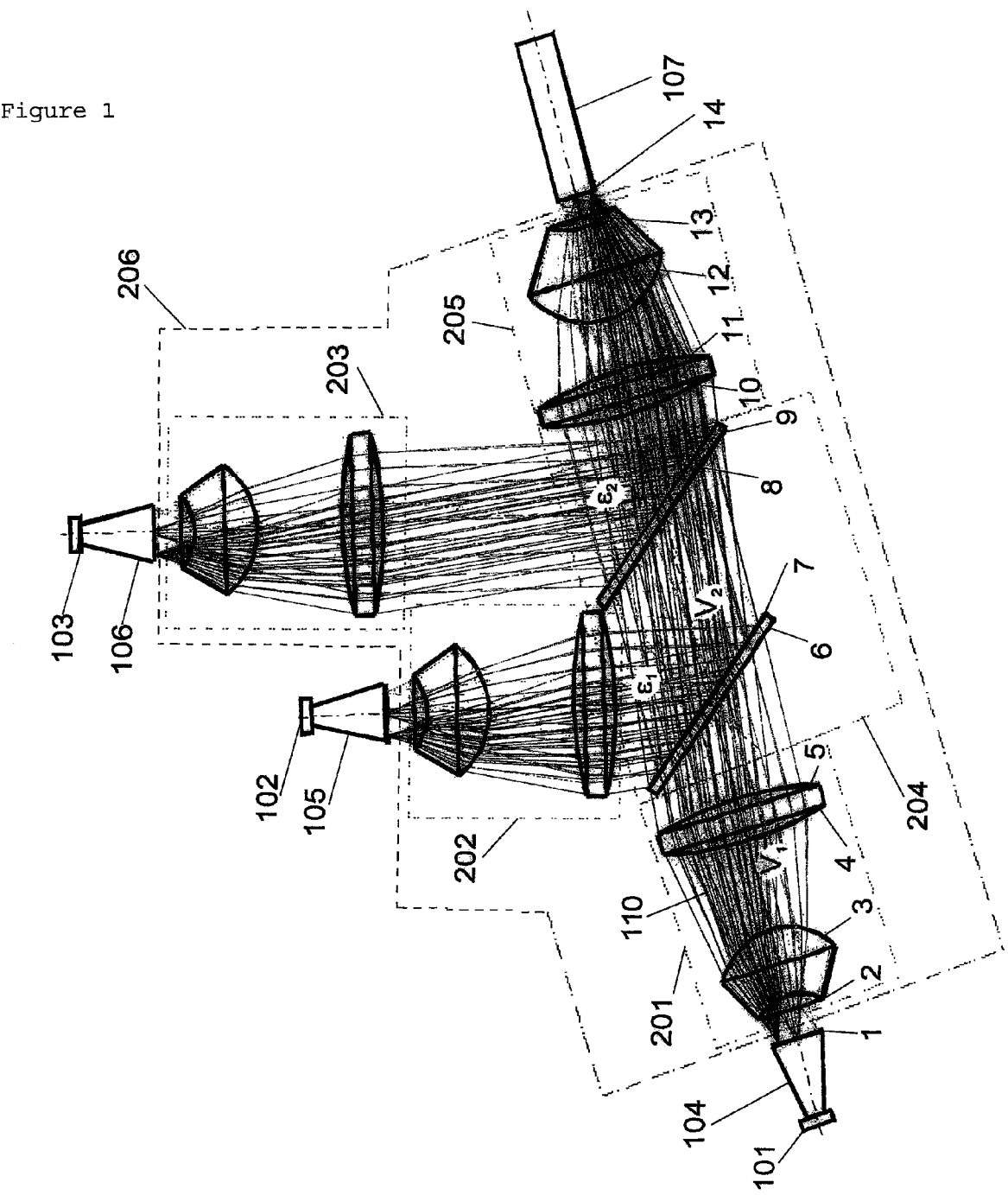
FIG. 1 shows an arrangement for the illumination of a field.

Twelve LEDs, 1×1 mm² in the colors red, green and blue, are used as light sources. The twelve LEDs are arranged, respectively, in a 4×3 matrix and form the red LED matrix 101, the green LED matrix 102 and the blue LED matrix 103. The light bundles exiting from each LED matrix are adapted in angle when passing through a respective concentrator 104, 105, 106 and the field is homogenized. The numerical aperture is reduced from 0.8 . . . 1 (LED-specific) to 0.3 . . . 0.5, and is typically 0.4.

The green and blue light bundles are superimposed with the red light bundle by means of interference layer beamsplitters which form the device for combining the light bundles 204. The entire illuminated field which is formed by uniting the three light bundles has a lateral magnification of 3×4 and a symmetric angular emission. Three collector optics 201, 202, 203 and in-coupling optics 205, together with the device for combining the light bundles 204, form relay optics 206 and are dimensioned in such a way that the light loss is reduced as much as possible.

The light throughput is cut off as little as possible in the two directions x and y. The relay optics 206 couple the field into the light inlet face of a light mixing rod 107 which further homogenizes the field. By increasing the throughput, the size of the field can be adapted to the light-emitting surface of the light mixing rod in such a way that the field, for example, illuminates a DMD chip uniformly and with as little loss as possible.

The following optical data are given for the relay optics 206 for color mixing (from the light-emitting surfaces of the concentrators 104, 105, 106 to the light inlet face of the light mixing rod 107):

For the red channel which is determined by the light propagation of the red LED 101:

| Surface number | RADIUS | DISTANCE | Free radius of the lens | Medium |
|---|---|---|---|---|
|  |  |  |  | air |
| 1 | U |  | 6.1 |  |
|  |  | 10.51 |  | air |
| 2 | −13.038 |  | 9.083 |  |
|  |  | 15 |  | stim2 |
| 3 | −17.998 |  | 15.328 |  |
|  |  | 17.72 |  | air |
| 4 | 78.280 |  | 21.219 |  |
|  |  | 10.17 |  | sbsm2 |
| 5 | −78.28 |  | 21.272 |  |
|  |  | 20 |  | air |
| 6 | U |  | 25.545 |  |
|  |  | 2.5 |  | nbk7 |
| 7 | U |  | 26.003 |  |
|  |  | 41.5 |  | air |
| 8 | U |  | 24.718 |  |
|  |  | 2.5 |  | nbk7 |
| 9 | U |  | 24.257 |  |
|  |  | 23 |  | air |
| 10 | 78.28 |  | 21.914 |  |
|  |  | 10.17 |  | sbsm2 |
| 11 | −78.28 |  | 21.847 |  |
|  |  | 14.26 |  | air |
| 12 | 19.03 |  | 16.143 |  |
|  |  | 21 |  | stim2 |
| 13 | 16.861 |  | 7.543 |  |
|  |  | 6.61 |  | air |
| 14 | U |  | 5.31 |  |
|  |  |  |  | air |

The dimensioning of the red channel applies in a corresponding manner to the green channel which is defined by the light propagation of the green LEDs 102 and to the blue channel which is determined by the light propagation of the blue LEDs 103. This reduces manufacturing cost.

The device for combining the light bundles 204 comprises two interference layer beamsplitters which are made of transparent plane-parallel plates as substrate material with n=1.5 and a thickness of 1 mm. These cause a parallel offset of the optical axes in each instance. However, the optical axis of the first collector optics is displaced by offset $V_1$=0.52 mm relative to the optical axis of the in-coupling optics, and the optical axis of the second collector optics is displaced by offset $V_2$=0.26 mm relative to the optical axis of the in-coupling optics. Further, the optical axes of the second and third collector optics are bent through the interference layer beamsplitters, wherein the selected incident angles $\epsilon_2$ and $\epsilon_3$ on the dichroic layers are 38° in each instance. The dichroic layers are dimensioned in such a way that the acceptance angle is ±10°. Owing to the respective spectrum of the LEDs, this step serves to minimize losses. The concentrators 104, 105 and 106 are advantageously constructed identically and are connected to the respective color LEDs. The concentrators serve to collect the light emitted by the LEDs, to carry out an emission angle transformation, and to homogenize the illuminated field at the light-emitting surfaces 305 of the concentrators.

With respect to dimensioning, it is important that the light-emitting surfaces 305 of the concentrators 104, 105 and 106 are superimposed congruently on the light inlet face of the light mixing rod 107.

By means of the described arrangement, a compromise was found between the structural length of the CPC concentrators and the quantity of lenses that are needed for the required corrections.

Figure 2:
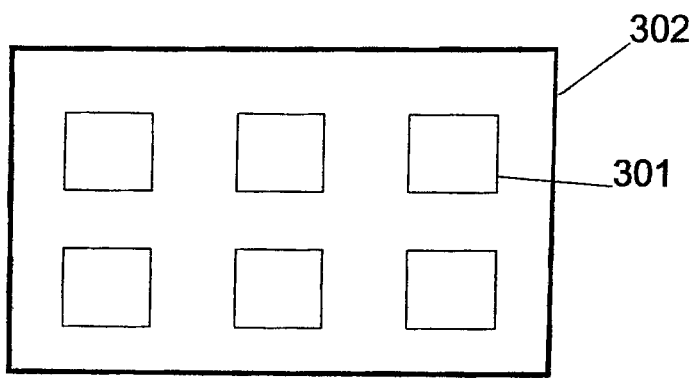
FIG. 2 shows an array of a plurality of individual LEDs.

An array 302 of a plurality of individual LEDs 301 is shown schematically in FIG. 2. Each LED 301 corresponds to a light inlet face 304 of an array of integrator rods 300 which are shown in one of FIG. 4 or 5 and which are used as concentrators 104 to 106 in connection with the invention. Through the choice of the number of individual LEDs in the rows and columns, the required cross section of the light-emitting surface 305 is advantageously generated and its beam characteristic can be better adapted.

Figure 3:
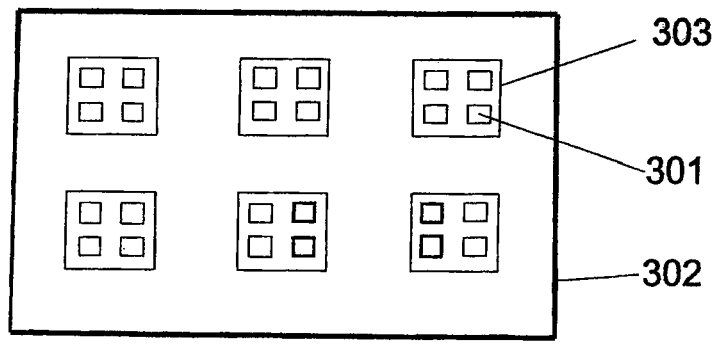
FIG. 3 shows an array of a plurality of LED arrays.

An array 302 which is itself formed by a plurality of LED arrays 303 is shown schematically in FIG. 3. Each LED array 303 in turn has a plurality of individual LEDs 301 arranged in the shape of an array.

Figure 4:
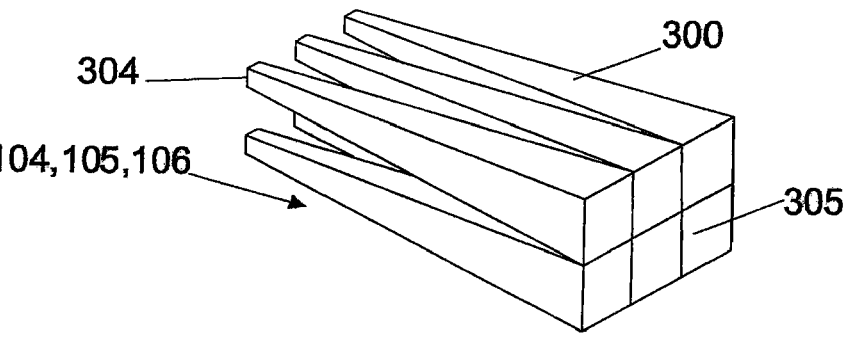
FIG. 4 shows an array of integrator rods constructed as a solid integrator.

FIG. 4 shows an array of integrator rods 300 constructed as a solid integrator as used in the invention as concentrators 104 to 106.

Figure 5:
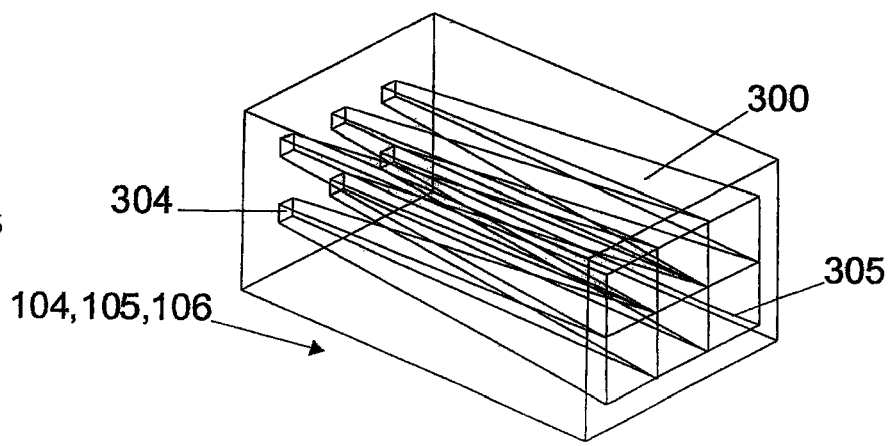
FIG. 5 shows an array of integrator rods constructed as a hollow integrator.

FIG. 5 shows an array of integrator rods 300 constructed as a hollow integrator as used in the invention as concentrators 104 to 106. The integrator rods are preferably arranged as arrays 2*1, 2*2 or 3*2, and the cross section of the integrator rods 300 is preferably trapezoidal, particularly rectangular.

While the foregoing description and drawings represent the present invention, it will be obvious to those skilled in the art that various changes may be made therein without departing from the true spirit and scope of the present invention.

REFERENCE NUMBERS

1 to 14 optically active surfaces
100 light bundle
101 red LED array
102 green LED array
103 blue LED array
104 concentrator
105 concentrator
106 concentrator
107 light mixing rod
114 optical axis of the in-coupling optics
201 first collector optics
202 second collector optics
203 third collector optics
204 device for combining the light bundles
205 in-coupling optics
206 relay optics
300 integrator rod
301 LED
302 array
303 LED array
304 light inlet face of the concentrator
305 light-emitting surface of the concentrator
$\beta$ tilt of the optical axis in the projection objective
$\epsilon_2$ incident angle from the second collector optics
$\epsilon_3$ incident angle from the third collector optics
V offset of the optical axes in the relay optics
M imaging scale
$V_1$ offset of the first collector optics
$V_2$ offset of the second collector optics

What is claimed is:

1. An arrangement for the illumination of a field comprising:
    a combined light source having three groups of LEDs which emit light bundles in different colors (R, G, B), said light bundles—considered in the direction of light propagation—passing collector optics;
    a device for combining the light bundles; and
    in-coupling optics;
    said combined light source having a first light source comprising a matrix of red LEDs, a second light source comprising a matrix of green LEDs, and a third light source comprising a matrix of blue LEDs;
    each LED matrix having a light emitting surface coupled with a light inlet face of a concentrator;
    each concentrator opening in a funnel-shaped manner in the light propagation direction;
    said collector optics and in-coupling optics being dimensioned in such a way that the surface shape of every light-emitting surface of the concentrators is transmitted to a light inlet face of a light mixing rod in such a way that they are congruently superimposed on one another; and
    wherein the third collector optics and the in-coupling optics define an optical axis that is identical to the center of gravity axis of the light mixing rod, and the optical axis of the first collector optics has a first offset and the optical axis of the second collector optics has a second offset, wherein the center of gravity axes of the light-emitting surfaces of the concentrators associated with the respective collector optics are identical to the optical axes of the collector optics.

2. The arrangement according to claim 1, wherein the matrix of LEDs has a trapezoidal light-emitting surface.

3. The arrangement according to claim 1, wherein the light-emitting surface of the concentrator is trapezoidal.

4. The arrangement according to claim 1, wherein every concentrator reduces the numerical aperture of the light bundles at the light-emitting surface by a factor between 0.6 and 0.3.

5. The arrangement according to claim 1, wherein an air gap between 0 and 1 mm is provided between the light-emitting surfaces of the matrix of red/green/blue LEDs and a light inlet face of the concentrator.

6. The arrangement according to claim 1, wherein the device for combining the light bundles contains two interference layer beamsplitters whose layers are arranged on a surface of a plane-parallel plate, beamsplitter cube or beamsplitter prism.

7. The arrangement according to claim 1, wherein the light-emitting surfaces of the concentrators are congruent.

8. The arrangement according to claim 1, wherein the collector optics are identical.

9. The arrangement according to claim 8, wherein the collector optics contain in each instance a concave-convex lens and a biconvex lens.

10. The arrangement according to claim 1, wherein the in-coupling optics contain a biconvex lens and a concave-convex lens.

11. The arrangement according to claim 1, wherein the concentrator is formed of a matrix of individual integrator rods, each integrator rod being coupled with an individual LED or a matrix of LEDs.

* * * * *